United States Patent Office 3,269,942
Patented August 30, 1966

3,269,942
METHOD FOR PROTECTING AQUEOUS MEDIA AGAINST MICROORGANISMS WITH CYCLOPENTANONES
Louis P. Wilks, Chicago, Ill., assignor to Velsicol Chemical Corporation, Chicago, Ill., a corporation of Illinois
No Drawing. Filed Apr. 10, 1963, Ser. No. 271,865
5 Claims. (Cl. 210—64)

This invention relates to a method of slime control. More specifically, this invention relates to a method for the protection of aqueous media against infection by slime-producing microorganisms.

Throughout industry, a great deal of damage is caused by slime-producing microorganisms wherever aqueous systems may be used. For example, the presence of slime in the aqueous systems of machines in the paper industry often creates conditions which prevent the economic operation of such machines. The glue, starch, and other substances present in the aqueous media used in the paper industry have nutritive value for many microorganisms, which thrive under these conditions and form masses of slime. Such slime in the machines can interfere with normal paper sheet formation, give rise to lumps in the pulp, interfere with the flowability of pulp suspensions, and generally cause difficulties in the paper-making process.

The recognized methods of attempting to combat slime in the paper industry include frequent washing of the machinery. However, this method is not fully satisfactory and has the disadvantage of requiring expensive down time for the machinery. Various chemical substances have also been tried for the control of slime-producing microorganisms, but these have had limited success. Many of such substances have the further disadvantage of being metal-containing compounds which are highly toxic to man.

It has been found, however, that aqueous media can be protected against infection by slime-producing microorganisms by the method which comprises adding to the aqueous media a compound selected from the group consisting of a 2,5-bis(N,N-dialkylaminomethyl)cyclopentanone of the formula

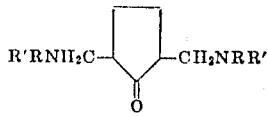

wherein R and R' are lower alkyl, and water soluble salts thereof. By lower alkyl are meant those alkyl groups which contain up to four carbon atoms. This type of chemical compound is known in the chemical art and can be prepared, for example, by the method described by F. F. Blicke and F. J. McCarty in the Journal of Organic Chemistry, vol. 24, pages 1069–76 (1959). The compounds can be used in the form of the free amine and include such compounds as 2,5-bis(N,N - dimethylaminomethyl)cyclopentanone, 2,5 - bis(N,N - diethylaminomethyl)cyclopentanone, 2,5-bis(N,N-di-n-propylaminomethyl)cyclopentanone, 2,5-bis(N,N-di-isopropylaminomethyl)cyclopentanone, 2,5-bis(N,N-di-n-butylaminomethyl)cyclopentanone, 2,5 - bis(N-methyl-N-ethylaminomethyl)cyclopentanone, 2 - (N,N - dimethyl-aminomethyl) - 5 - (N,N - diethylaminomethyl)cyclopentanone, and the like.

The method of this invention preferably makes use of the amine compounds in the form of their water soluble salts. These include such recognized salts as the hydrochloride, hydrobromide, hydroiodide, sulfate, acetate, tartrate, and the like. Such water soluble salts have the advantage that they can ordinarily be added directly to the aqueous media without other adjuvants. The free amines are usually comparatively insoluble in water, and they are preferably combined with a few percent by weight of an emulsifier or wetting agent of the type well known in the art before being added to the aqueous media.

The exact quantity of the 2,5-bis(N,N-dialkylaminomethyl)cyclopentanone or a water soluble salt thereof to be used in the method of this invention will depend on a variety of factors, particularly the type of organisms encountered and the intensity of the infestation. The compound should be added to the aqueous media in a biocidally effective amount, which in the instant method will be equivalent to a slimicidally effective amount. In a preferred embodiment of the method of this invention, the 2,5-bis(N,N-dialkylaminomethyl)cyclopentanone or a water soluble salt thereof will be added to the aqueous media in an amount to provide a concentration of up to about 1,000 parts per million in the aqueous media. In a most preferred embodiment of the method of this invention, an amount will be added to provide a concentration of up to about 500 parts per million.

The control of slime-producing microorganisms by the method of this invention is illustrated in the following example.

EXAMPLE

*Control of slime-producing microorganisms with 2,5-bis (N,N-dimethylaminomethyl)cyclopentanone hydrochloride*

The slimicidal activity of the title compound in aqueous media was shown by tests for its activity against four slime-producing microorganisms. A standard serial dilution technique was used with the test compound at a concentration range of from 1 p.p.m. to 500 p.p.m. The tests with the fungi species were carried out in Difco Sabouraud liquid medium, and incubation was at 25° C. for five days. The tests with the bacteria species were carried out in B.B.L. trypticase soy broth, and incubation was at 35° C. for 48 hours. The results of the tests are shown in the following table.

| Test culture: | Minimum inhibitory concentration (p.p.m.) |
|---|---|
| Aerobacter aerogenes | 250 |
| Bacillus mycoides | 62 |
| Aspergillus niger | 62 |
| Penicillium expansum | 31 |

What is claimed is:

1. The method for the protection of aqueous media against slime-producing microorganisms which comprises adding to the aqueous media a compound selected from the group consisting of a 2,5-bis(N,N-dialkylaminomethyl)cyclopentanone of the formula

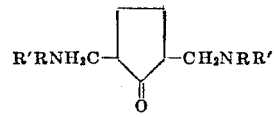

wherein R and R' are lower alkyl, and water soluble salts thereof.

2. The method of claim 1 wherein the compound is 2,5-bis(N,N-dimethylaminomethyl)cyclopentanone hydrochloride.

3. The method of claim 1, wherein the compound is 2,5 - bis(N,N-diethylaminomethyl)cyclopentanone hydrochloride.

4. The method of claim 1, wherein the compound is 2,5-bis(N,N-diisopropylaminomethyl)cyclopentanone hydrochloride.

5. The method of claim 1, wherein the compound is 2,5-bis(N,N-di-n-butylaminomethyl)cyclopentanone hydrochloride.

References Cited by the Examiner

UNITED STATES PATENTS

| | | | |
|---|---|---|---|
| 2,221,931 | 11/1940 | Treboux | 167—22 |
| 2,901,394 | 8/1959 | Rosher | 167—30 |

OTHER REFERENCES

Blicke et al.: Journal of Org. Chem., vol. 24, pp. 1069–1076 (1959).

Zsolnai: (Med. Univ. Debrecen, Hung.) Biochem. Pharmacol., vol. 11, pp. 995–1016 (1962) [cited in Chem. Abst., vol. 58, p. 837g (1963)].

JULIAN S. LEVITT, *Primary Examiner.*

GEORGE A. MENTIS, *Assistant Examiner.*